United States Patent [19]

Izumita et al.

[11] 4,413,284

[45] Nov. 1, 1983

[54] NOISE REDUCER FOR A SOLID STATE IMAGER

[75] Inventors: Morishi Izumita, Inagi; Toshiyuki Akiyama, Kodaira; Kazuhiro Sato, Tokyo; Shusaku Nagahara, Hachioji, all of Japan

[73] Assignee: Hitachi, Ltd., Tokyo, Japan

[21] Appl. No.: 336,322

[22] Filed: Dec. 31, 1981

[30] Foreign Application Priority Data

Jan. 21, 1981 [JP] Japan .................................. 56-6403

[51] Int. Cl.³ ........................ H04N 3/15; H04N 5/21; H04N 9/07
[52] U.S. Cl. .................................. 358/213; 358/167; 358/44
[58] Field of Search .................. 358/36, 44, 167, 212, 358/213; 250/211 J, 578

[56] References Cited

U.S. PATENT DOCUMENTS

| 4,079,423 | 3/1978 | Diehl | 358/213 |
| 4,212,034 | 7/1980 | Kokie et al. | 358/213 |
| 4,283,742 | 8/1981 | Izumita et al. | 358/213 |

Primary Examiner—John C. Martin
Attorney, Agent, or Firm—Antonelli, Terry & Wands

[57] ABSTRACT

This invention relates to a solid-state imaging apparatus wherein photo signals are read out through MOS type FETs from photosensors such as photodiodes arrayed in two dimensions in large numbers, and consists in remarkably enhancing the signal-to-noise ratio of an output signal by reducing or eliminating noise components to mix into the photo signals.

The analysis of the noise components has revealed the correlation in which the noise component in a certain polarity develops in the opposite polarity again after a period that is shorter than one horizontal scanning period by the duration of one horizontal scanning pulse. With note taken of the correlation, a solid-state imaging apparatus comprising a processing circuit which includes a delay circuit and an adder circuit and which cancels the noise is provided.

5 Claims, 21 Drawing Figures

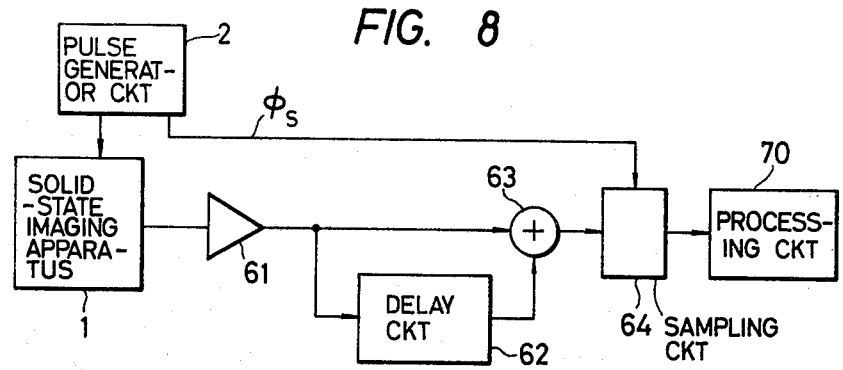
FIG. 8
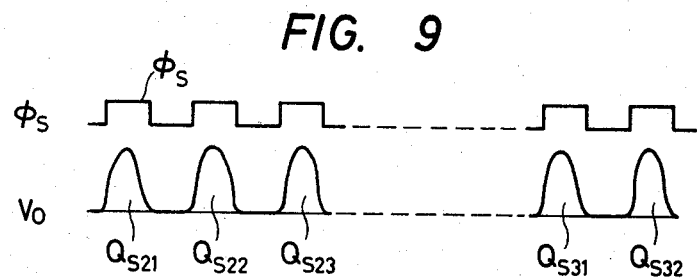
FIG. 9
FIG. 10
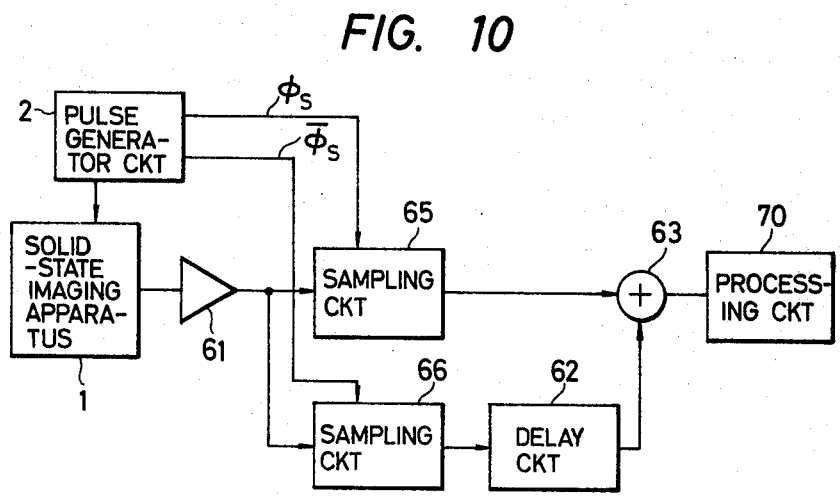

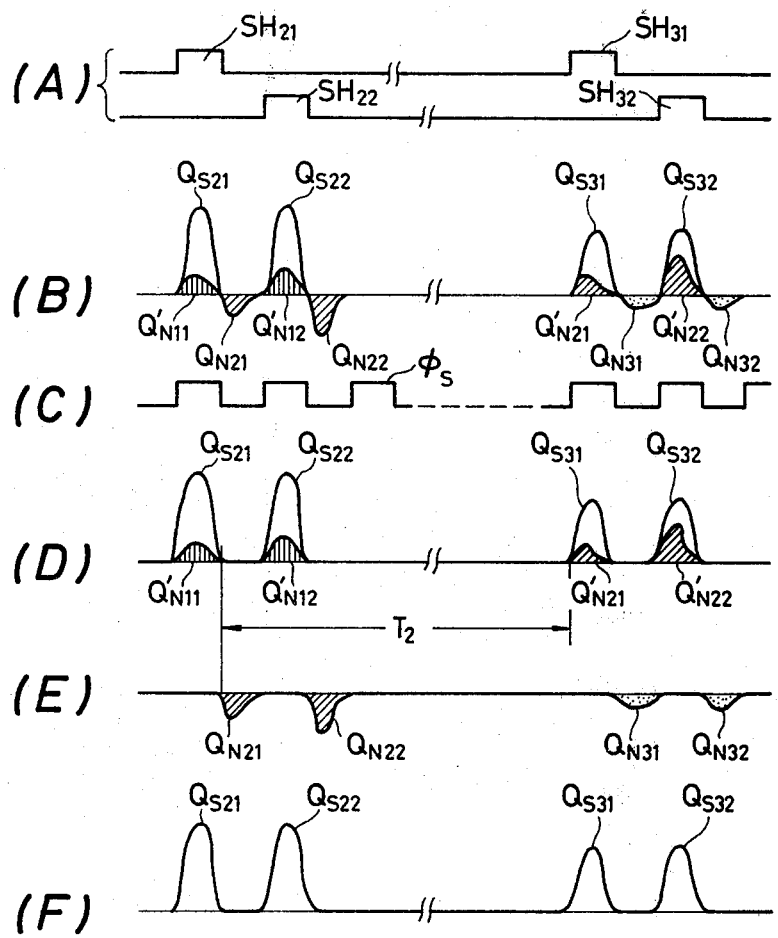

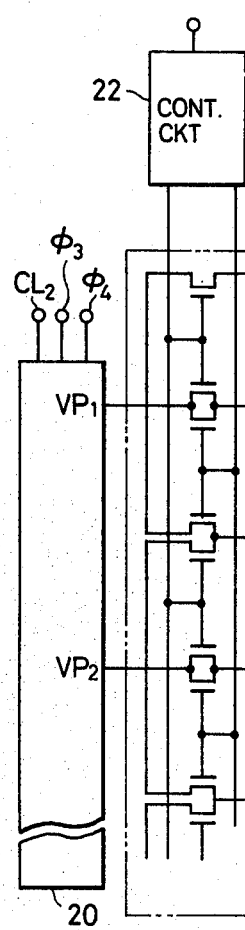
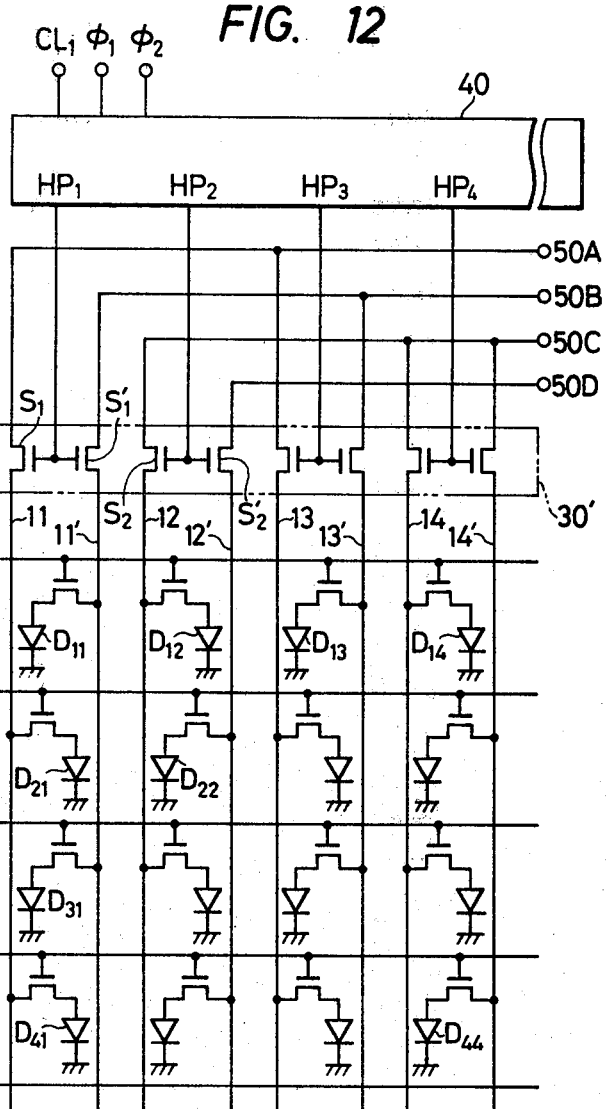
FIG. 13
FIG. 12

NOISE REDUCER FOR A SOLID STATE IMAGER

BACKGROUND OF THE INVENTION

This invention relates to a solid-state imaging apparatus in which photo signals are read out through MOS type field effect transistors from a large number of photosensors arrayed in two dimensions.

A solid-state imaging apparatus wherein a plurality of photosensors such as photodiodes are arrayed in horizontal and vertical directions on a semiconductor substrate and wherein signal charges corresponding to the quantities of incident light as stored in the respective photosensors are sequentially read out through switches constructed of MOS type field effect transistors (hereinbelow, termed "MOS-FETs"), has the advantages that comparatively great charge signals can be handled and that the dark current is little.

The MOS type solid-state imaging apparatus, however, involves the problem that noise which develop from the switches for controlling the readout of the signals of the photosensors, especially the switches for the horizontal scanning are delivered in superposition on the photo signals from the photosensors.

The noise are classified into the so-called "fixed pattern noise" which appears as fixed vertical stripes on a reproduced picture, and the "random noise" which appears as irregular fluctuations. Although the cause of the former noise has been cleared up, any effective method of reducing the latter noise has not been found at present.

SUMMARY OF THE INVENTION

An object of this invention is to provide a solid-state imaging apparatus with the random noise reduced.

In order to accomplish the object, according to this invention, a solid-state imaging apparatus wherein a plurality of photosensors are arrayed in horizontal and vertical directions on a semiconductor substrate, photo signal outputs from the photosensors are read out onto vertical signal lines through a first group of switches which are driven by vertical scanning pulses, and the photo signal outputs on the respective vertical signal lines are fetched onto an output line through a second group of switches which are driven by horizontal scanning pulses, is so constructed as to add the output from the output line and a signal with the output delayed a period shorter than one horizontal scanning period by the time of one horizontal scanning pulse and to deliver the resulting signal as a video signal.

BRIEF DESCRIPTION OF THE DRAWINGS

FIG. 8 is a circuit arrangement diagram of the second embodiment of this invention, FIG. 9 is a signal waveform diagram for explaining the operation of the circuit arrangement of the second embodiment, FIG. 10 is a circuit arrangement diagram of the third embodiment of this invention, FIGS. 11(A)-11(F) are waveform diagrams of noise and signals for explaining the operation of the circuit arrangement of the third embodiment, FIG. 12 is a diagram showing another example of the structure of the MOS type solid-state imaging apparatus, and FIG. 13 is a diagram showing an example of the structure of a color filter which is applied to the apparatus of FIG. 12.

DETAILED DESCRIPTION OF THE PREFERRED EMBODIMENTS

Figure 1:
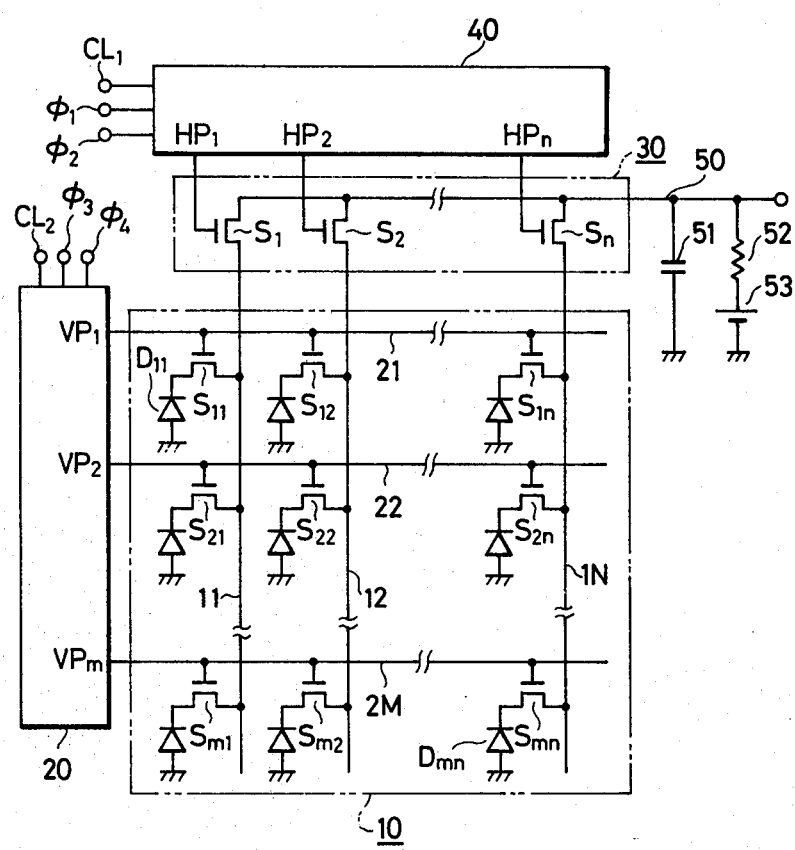
FIG. 1 is a diagram showing the structure of a MOS type solid-state imaging apparatus.

FIG. 1 shows an example of a MOS type solid-state imaging apparatus to which this invention is applied. This solid-state imaging apparatus is constructed of a photosensitive portion 10, a vertical scanning circuit 20, a horizontal switching portion 30 and a horizontal scanning circuit 40.

On a semiconductor substrate not shown, photodiodes $D_{11}$–$D_{mn}$ are arrayed in two dimensions with n photodiodes being included in each row in the horizontal direction and m photodiodes being included in each column in the vertical direction. Signals of the photodiodes $D_{11}$–$D_{mn}$ are read out onto vertical signal lines 11–1N through vertical switches $S_{11}$–$S_{mn}$ which are MOS-FETs. The gates of the vertical switches $S_{11}$–$S_{mn}$ are connected to horizontal signal lines 21–2M in such a manner that those of the vertical switches in an identical row are collectively connected to the corresponding horizontal signal line. The photodiodes $D_{11}$–$D_{mn}$, the vertical switches $S_{11}$–$S_{mn}$, the vertical signal lines 11–1N and the horizontal signal lines 21–2M constitute the photosensitive portion 10. The vertical switches $S_{11}$–$S_{mn}$ have their respective rows controlled "on" and "off" by output pulses $VP_1$–$VP_m$ from the vertical scanning circuit 20. This vertical scanning circuit 20 is constructed of, for example, a shift register which operates to shift a vertical input pulse $CL_2$ by the use of clocks $\phi_3$ and $\phi_4$ synchronous with the horizontal scanning. The group of horizontal switches 30 are constructed of horizontal switches $S_1$–$S_n$ being MOS-FETs which serve to supply an output line 50 with the photo signals read out onto the vertical signal readout lines 11–1N. These switches are sequentially controlled "on" and "off" by output pulses $HP_1$–$HP_n$ from the horizontal scanning circuit 40. Also this horizontal scanning circuit 40 is constructed of, for example, a shift register which operates to shift a horizontal input pulse $CL_1$ with clocks $\phi_1$ and $\phi_2$. An output line 31 is connected to a preamplifier not shown. In this figure, the combined capacitance between the input capacitance of the preamplifier and the stray capacitance of the output line 31 is indicated by a capacitor 51. The input impedance of the preamplifier is indicated by a resistance element 52, and a power source by a part 53.

Figure 2:
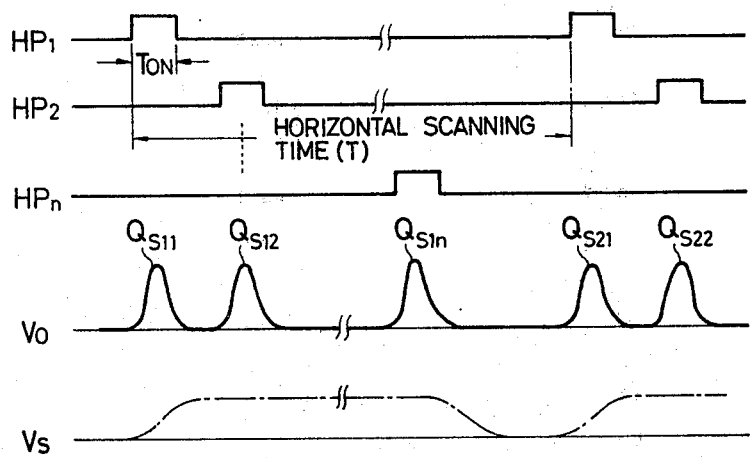
FIG. 2 is a waveform diagram for explaining the relationship in the solid-state imaging apparatus between horizontal scanning pulses and signal outputs.

In such solid-state imaging apparatus, a video signal becomes as illustrated in FIG. 2. Now, when the vertical scanning pulse $VP_1$ has become "1" and has been impressed on the horizontal signal line 21, signal charges $Q_{s11}$-$Q_{s1n}$ corresponding to the quantities of incident light and stored in the photodiodes $D_{11}$-$D_{1n}$ of the first row appear on the vertical signal lines 11-1N, respectively. Further, when the horizontal switches $S_1$-$S_{1n}$ have been sequentially turned "on" by the horizontal scanning pulses $HP_1$-$HP_n$, photo signal outputs $V_o$ as shown in FIG. 2 are read out onto the output line 50. The outputs $V_o$ in FIG. 2 illustrate only photo signal components free from noise components, and their peak values represent the intensities of light. The photo signal $V_o$ is smoothed by passing it through a low-pass filter which has a cutoff frequency equal to half of the frequency of the horizontal scanning pulses. Thus, the video signal $V_s$ can be obtained.

In the actual solid-state imaging apparatus, the noise components appear in superposition on the photo signal $V_o$. The fixed pattern noise appears as indicated at $FP_j$ in FIG. 3. That is, in response to the voltage $H_{Hj}$ of the horizontal pulse $HP_j$, current $FP_j$ flows from the power source 53 so as to charge the gate-source path of the horizontal switch. The quantity of charges $Q_j$ to be stored at this time is determined by the gate capacitance of the horizontal switch, the stray capacitance of the vertical signal line and the capacitance 51 of the output circuit. When the horizontal pulse $HP_j$ has turned "off", current flows so as to erase the charges $Q_j$. At this time, the gate capacitance of the horizontal switch and the stray capacitance of the vertical signal line have different values in dependence on the horizontal position of the imaging apparatus. The noise components $FP_j$ are accordingly inherent in the horizontal direction, and they form vertical stripe patterns on a screen. Such fixed pattern noise $FP_j$ is attributed to the migrations of charges which are opposite in phase and equal in amount between in the "on" period $T_{ON}$ of the horizontal switch and in a period $T_{ON}'$ subsequent to the turn-off thereof ($T_{ON}'=T_{ON}$). The fixed pattern noise can therefore be erased by integrating the output signal of the output line 50 for a period ($T_{ON}+T_{ON}'$).

The inventors of the present invention further analyzed the random noise. As a result, it has been found out that the random noise contains components having a vertical correlation. On the basis of the finding, this invention has been constructed so as to effectively eliminate the random noise by exploiting the vertical correlation. Hereunder, the operating principle of the invention will be described.

Figure 4:
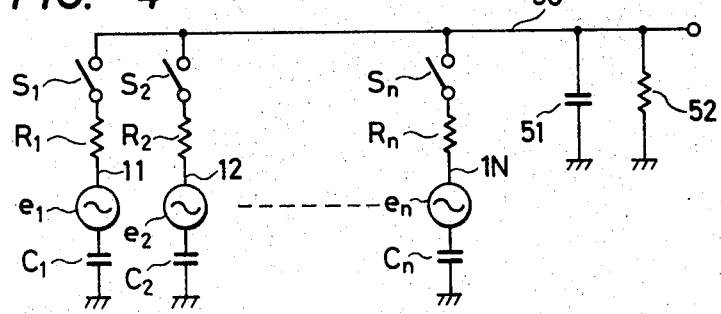
FIG. 4 is a diagram of an equivalent circuit concerning the random noise.

The group of vertical switches $S_{11}$-$S_{mn}$ and the group of horizontal switches $S_1$-$S_n$ are considered as random noise sources, but noise from the former are very small. Noise from the group of horizontal switches are therefore considered, and the random noise circuit of this group of switches can be simulated as shown in FIG. 4. $R_1$-$R_n$ denote the "on" resistances of the horizontal switches $S_1$-$S_n$, and thermal noise generated therefrom are indicated by $e_1$-$e_n$. $C_1$-$C_n$ indicate the stray capacitances of the vertical signal lines connected to the respective horizontal switches. Here, letting k denote Boltzmann's constant, T denote the absolute temperature of the resistance $R_i$ and $\Delta f$ a frequency bandwidth, the thermal noise $e_i$ (i=1—n) is represented by the following equation:

$$\overline{e_i^2}=4kT\cdot R_i\cdot\Delta f \qquad (1)$$

Figure 5:
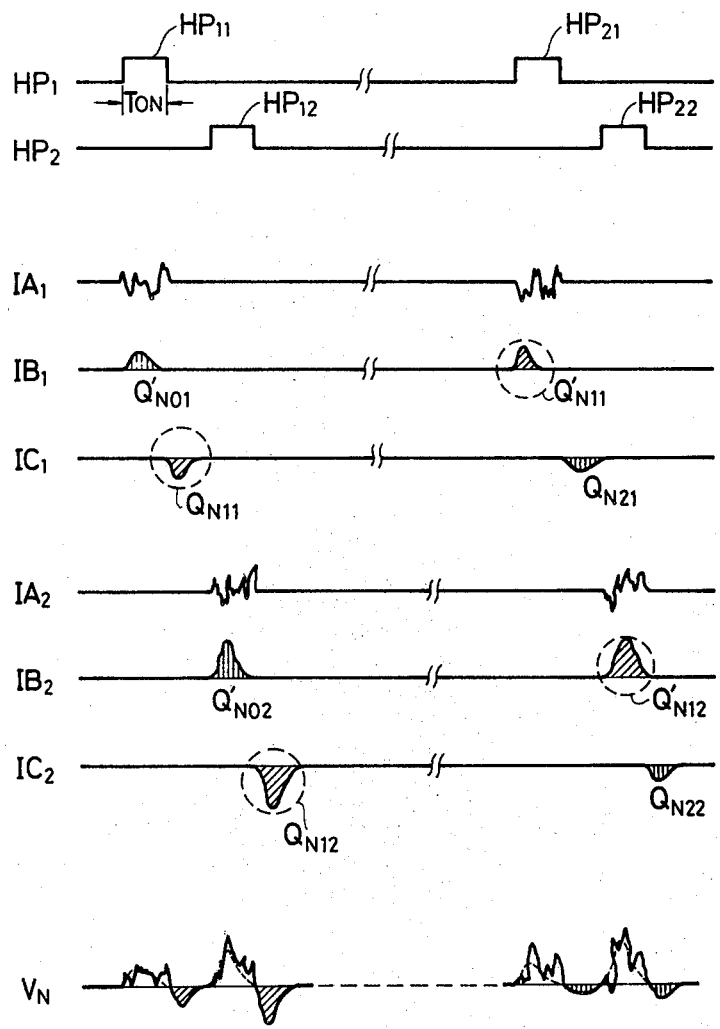
FIG. 5 is a waveform diagram for explaining the random noise which develop from the MOS type solid-state imaging apparatus.

As the thermal noise $e_i$, random noise currents $IA_1$ and $IA_2$ as shown in FIG. 5 flow to the output line 50 when the switches $S_1$ and $S_2$ have been turned "on" and "off" by the horizontal scanning pulses $HP_1$ and $HP_2$, respectively. Further, the inventors have found out that the moment the horizontal switches $S_1$ and $S_2$ have turned "off", noise currents in waveforms $IC_1$ and $IC_2$ as shown in FIG. 5 flow to the output line 50, respectively, and that when the horizontal switches $S_1$ and $S_2$ have subsequently turned "on", noise currents $IB_1$ and $IB_2$ having correlations with the currents $IC_1$ and $IC_2$ flow as shown in the figure, respectively. It has been found out that the noise currents $IC_1$, $IC_2$ and $IB_1$, $IB_2$ are superposed on the currents $IA_1$, $IA_2$ to form random noise as shown at $V_N$ in the figure.

By way of example, when a scanning pulse $HP_{11}$ has disappeared to turn "off" the horizontal switch $S_1$, noise charges $Q_{N11}$ corresponding to the magnitude of the thermal noise $e_1$ are induced in the capacitance 51 etc. on the output line (50) side and give rise to the current $IC_1$. When the switch $S_1$ has turned "on" owing to the next scanning pulse $HP_{21}$, the current $IB_1$ will flow so that charges $Q_{N11}'$ corresponding to the charges $Q_{N11}$ and opposite in sign thereto may be stored in the stray capacitance $C_1$ of the vertical signal line on the basis of the relation of charge conservation. Accordingly, the two noise currents $IB_1$ and $IC_1$ have the opposite polarities. It has also been found out that the current $IB_1$ arises after the current $IC_1$ with a lag approximately equal to one horizontal scanning period, exactly with a lag of a time shorter than one horizontal scanning period by one scanning pulse width $T_{ON}$.

Figure 6:
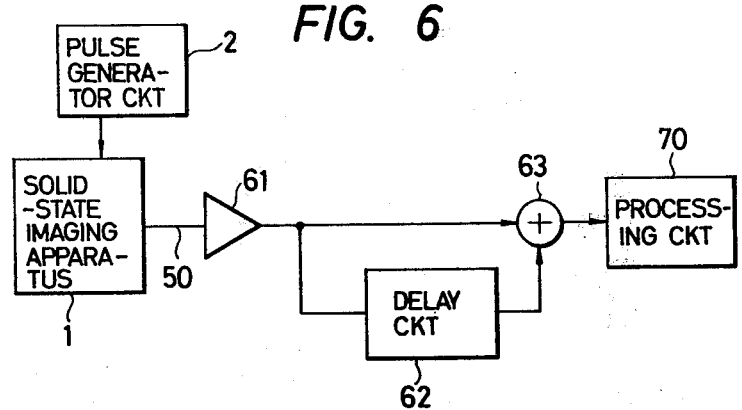
FIG. 6 is a circuit arrangement diagram of the first embodiment of this invention.

By utilizing such correlation of the random noise on the currents $IB_1$ and $IC_1$, this invention reduces the random noise by means of a circuit arrangement as shown in FIG. 6. Referring to the figure, numeral 1 designates the solid-state imaging apparatus shown in FIG. 1, and numeral 2 a pulse generator circuit which gives pulse commands for operating the vertical and horizontal scanning circuits of the solid-state imaging apparatus. Numeral 61 indicates a preamplifier, numeral 62 a delay circuit which has a delay time equal to the period $T_2$ that is shorter than one horizontal scanning period $T_1$ by the pulse width $T_{ON}$ of one horizontal scanning pulse, numeral 63 a signal adder circuit, and numeral 70 a processing circuit. An output signal from the solid-state imaging apparatus 1 as includes random noise is amplified by the preamplifier 61, whereupon it is added by the adder circuit 63 with a signal delayed by the period $T_2$. The processing circuit 70 smooths the output of the adder circuit 63 as shown at $V_s$ in FIG. 2 by passing it through a low-pass filter, and mixes a blanking signal, a synchronizing signal etc. into the smoothed signal.

Figure 7:
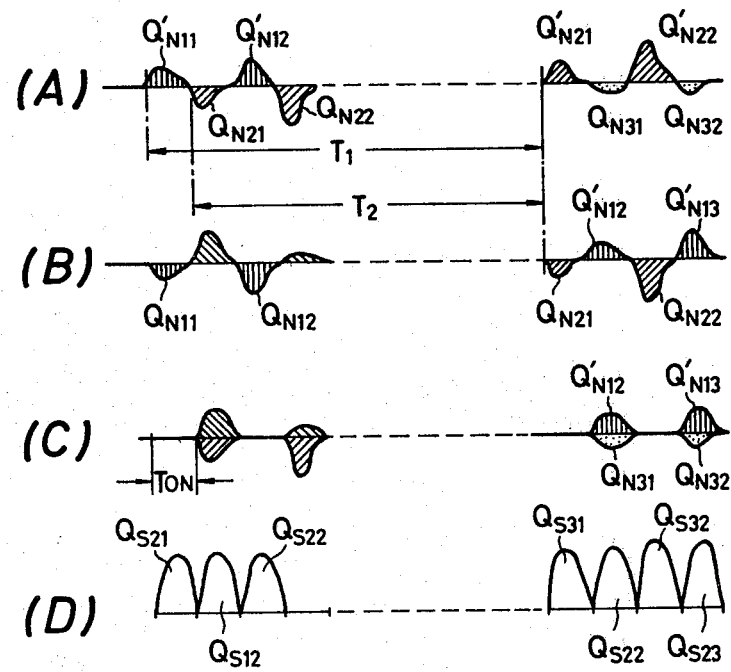
FIGS. 7(A)-7(D) are waveform diagrams of noise and signals for explaining the operation of the circuit arrangement of the embodiment.

Here, note is taken of two kinds of random noise components ($IB_1$, $IB_2$, ... and $IC_1$, $IC_2$, ... ) having the vertical correlation. Noise signals concerning the first to third horizontal scanning lines become as illustrated in FIG. 7(A). When passed through the delay circuit 62, the signals in FIG. 7(A) become as illustrated in FIG. 7(B). When the signals in FIGS. 7(A) and 7(B) are added by the adder circuit 63, the result becomes as depicted in FIG. 7(C). Thus, the correlative parts of the signals in FIGS. 7(A) and 7(B) are erased, and the noise components decrease sharply.

On the other hand, regarding a video signal, photo signals corresponding to two scanning lines are included, and hence, the signal-to-noise ratio is improved about 6 dB by this signal processing.

In case of the first embodiment described above, the adder circuit 63 mixes the signals corresponding to the two lines and then delivers the output. Therefore, when the photo signals have no correlation in the vertical direction, there is the problem that the vertical resolution of a picture is inferior in the condition left intact.

A circuit diagram of the second embodiment of this invention improved in the above point is shown in FIG. 8. In the figure, numeral 64 indicates a sampling circuit, and the other arrangement is the same as in FIG. 6. The sampling circuit 64 samples the output of the adder circuit 63 with a sampling pulse $\phi_s$ which is supplied from the pulse generator circuit 2 and which corresponds to the logical sum of the horizontal scanning pulses. Thus, the output part of the delay circuit 62 is removed from within the photo signals of the two lines shown in FIG. 7(D), and a photo signal corresponding to one line as shown by a waveform $V_o$ in FIG. 9 can be extracted. In addition, as understood by referring to FIG. 7(C), any random noise component due to charges induced when the switch has turned "off" is not contained in the output of the sampling circuit 64 at all. In case of the circuit of this embodiment, accordingly, random noise to be superposed on the photo signal are only thermal noise components corresponding to IA$_1$ and IA$_2$ in FIG. 5. Since the magnitude of the thermal noise is only several thousandths of the photo signal $V_o$ and one to several tenths of the correlative noise component, the effect of the improvement of the signal-to-noise ratio is very great.

Further, the third embodiment of this invention is illustrated in FIG. 10. This circuit arrangement is such that two sampling circuits 65 and 66 are added to the circuit arrangement of the first embodiment. The sampling circuit 66 may well be disposed behind the delay circuit 62. When the solid-state imaging apparatus 1 has been scanned by horizontal scanning pulses shown in FIG. 11(A), signal charge components $Q_{S21}$, $Q_{S22}$ ... and noise charge components $Q_{N11}'$, $Q_{N21}$, $Q_{N12}'$, $Q_{N22}$ ... are included in the output of the preamplifier 61 in positional relationships shown in FIG. 11(B). The first sampling circuit 65 samples the preamplifier output at the turn-on of the horizontal switch by the use of a sampling pulse $\phi_s$ shown in FIG. 11(C) and applies an output shown in FIG. 11(D) to the adder circuit 63. The second sampling circuit 66 samples the preamplifier output by the use of a sampling pulse $\bar{\phi}_s$ opposite in phase to the aforecited pulse $\phi_s$ and applies an output of a waveform shown in FIG. 11(E) to the delay circuit 62, which delays it a time T$_2$ and then applies it to the adder circuit 63. As apparent from the waveforms shown in FIGS. 11(D) and 11(E), when the adder circuit 63 adds the two inputs, the current components ascribable to the noise charges are canceled, and only the photo signal component is obtained as shown in FIG. 11(F).

Figure 3:
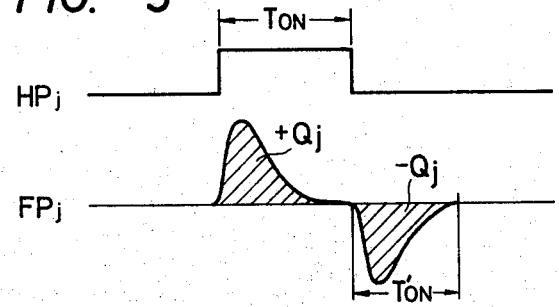
FIG. 3 is a waveform diagram for explaining the fixed pattern noise.

As described above, this invention has the effect of reducing or removing the random noise. In this regard, however, it has been revealed that when the output of the solid-state imaging apparatus is subjected to the processing of this invention as stated above, the opposite phase component $-Q_j$ of the fixed pattern noise FP$_j$ explained with reference to FIG. 3 is canceled by the positive phase component $+Q_j$ at the scanning of the next row, so the fixed pattern noise can be simultaneously erased.

FIG. 12 shows another example of the structure of the solid-state imaging apparatus 1 to which this invention is applicable. In this solid-state imaging apparatus, a switching circuit 21 is installed between the vertical scanning circuit 20 and a photosensitive portion, and the vertical switches corresponding to two rows can be simultaneously turned "on" or "off". In addition, using outputs from a control circuit 22, the combination of the horizontal signal lines to be simultaneously switched can be shifted one line. Each column is provided with one pair of vertical signal readout lines (11 and 11', 12 and 12', ... ), and the vertical switches in each column are alternately connected to these readout lines. Two of the horizontal switches connected to the vertical signal readout lines form each pair, and such paired horizontal switches are controlled "on" and "off" by one horizontal scanning pulse HP$_i$.

The solid-state imaging apparatus is provided with four output lines 50A–50D so that, when a mosaic color filter including four filter elements of white (W), green (G), cyan (Cy) and yellow (Ye) in combination as shown by way of example in FIG. 13 is superposed on the apparatus, color signals of the respective filter elements can be individually derived. This is intended to obtain a luminance signal and the predetermined color signals by operating the outputs. With the solid-state imaging apparatus, when the photo signal of the photodiode D$_{21}$ has been read out onto the output line 50A by way of example, noise charges Q$_{N11}$ are stored in the vertical signal line 11 at the instant of the turn-off of the horizontal switch S$_1$. In the next horizontal scanning, they have the correlation with the photo signal of the photodiode D$_{41}$ on the output line 50A. Accordingly, the random noise can be reduced by performing the signal processings as described in the first to third embodiments. Needless to say, similar signal processings are performed for the output lines 50B, 50C and 50D.

We claim:

1. In a solid-state imaging apparatus wherein photo signal outputs of a plurality of photosensors arrayed in horizontal and vertical directions are read out onto vertical signal lines through a first group of switches which are driven by vertical scanning pulses and wherein the photo signal outputs on the respective vertical signal lines are fetched onto an output line through a second group of switches which are driven by horizontal scanning pulses; a solid-state imaging apparatus characterized by comprising a delay circuit which delays the output from said output line a period that is shorter than one horizontal scanning period by approximately a duration of one horizontal scanning pulse, and an adder which adds an output of said delay circuit and said output of said output line, an output of said adder being delivered as a video signal.

2. A solid-state imaging apparatus according to claim 1, further comprising a signal sampling circuit which samples the output of said adder in synchronism with the horizontal scanning pulse, an output of said signal sampling circuit being delivered as a video signal.

3. A solid-state imaging apparatus according to claim 1, further comprising a first sampling circuit which is inserted before said adder and which samples the output of said output line in synchronism with said horizontal scanning pulse, and a second sampling circuit which is inserted before said delay circuit and which samples said output of said output line in synchronism with a negation signal of said horizontal scanning pulse.

4. A solid-state imaging apparatus according to claim 1, further comprising a first sampling circuit which is inserted before said adder and which samples the output of said output line in synchronism with said horizontal scanning pulse, and a second sampling circuit which is inserted before said adder and which samples the output of said delay circuit in synchronism with a negation signal of said horizontal scanning pulse.

5. A solid-state imaging apparatus according to claim 1, wherein said group of first switches read out the photo signal outputs of the photosensors on two horizontal scanning lines onto vertical signal lines by the use of one vertical scanning pulse.

* * * * *